(12) United States Patent
Aach et al.

(10) Patent No.: US 6,173,084 B1
(45) Date of Patent: Jan. 9, 2001

(54) NOISE REDUCTION IN AN IMAGE

(75) Inventors: Til Aach; Dietmar W. Kunz; Dietmar U. Koch, all of Aachen (DE)

(73) Assignee: U.S. Philips Corporation, New York, NY (US)

( * ) Notice: Under 35 U.S.C. 154(b), the term of this patent shall be extended for 0 days.

(21) Appl. No.: 09/090,102

(22) Filed: Jun. 3, 1998

(30) Foreign Application Priority Data

Jun. 6, 1997 (EP) ................................................. 97201718

(51) Int. Cl.[7] .................................................. G06K 9/36
(52) U.S. Cl. .......................................... 382/260; 382/299
(58) Field of Search ................................... 382/260–265, 382/299, 300, 240, 298

(56) References Cited

U.S. PATENT DOCUMENTS

| 5,022,091 | 6/1991 | Carlson | 382/49 |
| 5,454,047 | * 9/1995 | Chang et al. | 382/280 |
| 5,956,418 | * 9/1999 | Aiger et al. | 382/154 |

OTHER PUBLICATIONS

"Image filtering using multiresolution representation" by S. Ranganath, in the IEEE Transactions of Patteryn Analysis and Machine Intelligence, (13)1991, pp. 426–440.

* cited by examiner

Primary Examiner—Thomas D. Lee
Assistant Examiner—Stephen Brinich
(74) Attorney, Agent, or Firm—Dwight H. Renfrew

(57) ABSTRACT

The invention discloses a method of processing an image including the steps of decomposing the image into detail images at successive resolution levels. The detail images at successive resolution levels contain image information at respective spatial scales. Filtering of detail images is carried-out in dependence on at least one subsequent detail image having a lower resolution level than the current detail image. A processed image is reconstructed from the filtered detail images.

11 Claims, 4 Drawing Sheets

NOISE REDUCTION IN AN IMAGE

BACKGROUND OF THE INVENTION

1. Field of the Invention

The invention relates to a method of processing an image. The invention also relates to an image processor and to an x-ray examination apparatus.

2. Description of Related Art

The article Image filtering using multiresolution representation in the IEEE Transactions of Pattern Analysis and Machine Intelligence, 13(1991)426–440, by S. Ranganath, discloses a method for processing an image, wherein the image is decomposed into detail images at successive resolution levels, and the detail images are filtered so as to generate filtered detail images. The processed image is reconstructed from the filtered detail images.

The cited reference discloses image filtering using multiresolution representation. Image filtering is implemented as the convolution of the image and a two-dimensional mask. Preferably, a pyramid structure is applied for the multiresolution representation. In the cited reference the detail images of the multiresolution representation implemented by the pyramid structure are named 'coded images'. The cited reference mentions that the 'coded images' are filtered. The known method aims at achieving a good compromise between noise removal and loss of resolution. It has been found that the known method is not satisfactory with respect to reducing noise while retaining edges in the image. In particular, the known method is not suitable for producing a processed medical image having a high diagnostic quality, i.e. an image in which small details having low contrast are displayed so as to properly visible.

SUMMARY OF THE INVENTION

It is an object of the invention to provide a method of processing an image, which reduces noise and retains relevant image information more effectively than the known method.

This object is achieved by the method of processing an image according to the invention, which method comprises the steps of decomposing the image into detail images at successive resolution levels, filtering detail images to generate filtered detail images, filtering a current detail image in dependence on at least one subsequent detail image, said subsequent detail image having a resolution level which is lower than the resolution level of the current detail image, and reconstructing a processed image from the filtered detail images.

The detail images at successive resolution levels contain image information at respective spatial scales. The detail images are ordered according to decreasing resolution levels and increasing coarseness, that is the subsequent detail image contains coarser image features than the current detail image. Fine details are prominent in the detail image having the finest (highest) resolution level; progressively, coarser features become more prominent at the coarser (lower) resolution levels. Preferably, the decomposition of the image into detail images is carried out by means of a pyramid structure. In such a pyramid structure, the finest resolution level is at the base of the pyramid, the coarsest resolution level is at the top of the pyramid. In the pyramid structure, the detail images are derived as frequency-band images, i.e. spatial-frequency band-pass filtered versions of the image.

The filtering involves a local averaging of the detail images so as to reduce differences between pixel-values that are due to noise. As an alternative, the filtering may include a non-linear transformation of pixel-values. Pixel-values represent brightness values such as grey-values or colour-values of the image. Because the filtering of the current detail image depends on one or several detail images at coarser resolution levels, the method according to the invention distinguishes between image structures that appear at several resolution levels and image structures at only one or a few resolution levels. For example, pixel-values of the current detail image are retained when there is a significant corresponding structure at coarser resolution levels, but pixel-values of the current detail image are locally smoothed when there is hardly any significant structure at coarser resolution levels. In particular, a steep edge in the image appears at almost each of the resolution levels, but an extended slope in the pixel-values of the image appears almost only at one or a few subsequent resolution levels. It has been found that filtering in dependence on several lower resolution levels produces good results when said filtering is controlled by a sum of gradients of pixel-values of detail images having several resolution levels. The method of the invention retains relevant image information, notably directional structure-like edges in the image, and reduces noise even in portions of the image containing variations of pixel-values on a coarse scale. Because the filtering is adjusted on the basis of image information with spatial frequencies lower than the spatial frequencies of the current detail image, the filtering is notably insensitive to noise. The method of processing an image is particularly suitable for processing a medical diagnostic image, such as an x-ray image, a magnetic resonance image or an ultrasound image. Such a processed medical diagnostic image has a very small noise component and renders small details having little contrast properly visible.

A preferred embodiment of a method of processing an image according to the invention controls the filtering on the basis of the next detail image. Image structures, such as edges, relating to relevant image information appear most strongly at the next coarser resolution level. Since filtering of the current detail image is controlled on the basis of the correlation between image information in the current and the next detail images, it is effectively achieved to reduce noise while retaining relevant image information in the current detail image.

A preferred embodiment of a method of processing an image according to the invention controls filtering on the basis of differences between pixel-values in the subsequent detail image. Image structures are predominantly represented by differences between pixel-values. Notably image structures in the form of edges gives rise to differences between pixel-values at different positions in the image. The current detail image is strongly filtered, i.e. smoothed, at locations corresponding to locations in a detail image of the subsequent resolution level where there is a relatively small local difference between pixel-values, especially a small gradient of pixel-values. The pixel-values of the current detail image are retained at locations corresponding to locations in a detail image of the subsequent resolution level where there is a relatively large local difference between pixel-values, especially a large gradient of pixel-values. Image structures are predominantly represented by oriented structures like edges or lines. These structures have a strong variation in intensity in one direction in the image whereas the intensity variation in the direction at right angles thereto is small. In the vicinity of such an image structure, the gradient of pixel-values has a high magnitude and a direction perpendicular to the orientation of the image structure. Local averaging perpendicularly to the gradient, i.e. along the elongate image structure hardly affects the strength of visually important intensity transitions, notably variations along the image structures are mainly due to noise.

Edges or other steep transitions result in strong local gradients in detail images at several resolution levels. Moreover, the direction of maximum local variation and therefore also the direction of the gradient will be substantially equal in detail images at several resolution levels. The amplitude of the gradient may vary from level to level depending on the steepness of the transition and the size of the structure. Therefore the information contained in the gradients for different resolution levels is similar for adjacent resolution levels. The information in the coarser resolution levels is less affected by noise and is therefore more reliable. A strong image structure in the subsequent, preferably the next, detail image controls the filter at the current detail image to preserve the pixel-value so as to retain relevant image information in the current detail image.

In a preferred embodiment of a method of processing an image according to the invention, filtering of the current detail image includes computation of weighted averages of pixel-values of the current detail image. Filtering of pixel-values in the current detail image includes computation of local weighted averages of pixel-values of the current detail image. In particular, filtering of the current detail image includes computation of a weighted average of neighbouring pixels in the current detail image with weights obtained by finding the direction in which the neighbouring pixel is located in the current detail image with respect to the pixel to be filtered, calculating the magnitude of the difference between pixel values in said direction at least one of the coarser resolution levels. The higher this difference is, the lower the selected weight is. The weights have a low magnitude for pixel-values which are far apart in the current detail image, so that local averaging in the current detail image is achieved. As differences between, especially gradients of, pixel-values in the subsequent detail image and corresponding pixel-values in the current detail image are larger, the weights are smaller, so that in the current detail image filtering more predominantly retains the pixel-values of the current detail image. The weights are such that as differences between pixel-values in the subsequent detail image are larger, the computation of weighted averages in the current detail image takes pixel-values in a smaller region into account. Preferably, the weights have a smaller magnitude for relevant positions in the current detail image that are far apart, and the weights have a smaller magnitude as the gradient in the subsequent detail image has a larger magnitude at positions corresponding to said relevant positions in the current detail image. The weights also depend, in particular, on the relative direction of the gradient with respect to the difference between relevant positions in the subsequent detail image. Accordingly, the weights take directional structure in the image information in the subsequent image into account. Notably, the weights have lower magnitude as the gradient of the pixel-value is transverse to the difference between relevant positions in the subsequent detail image. To reduce noise in the image, in separate detail images pixel-values are replaced by a weighted sum of the pixel value at issue in the detail image and the corresponding values for neighbouring pixels. If the vector pointing from the pixel at issue towards one of its neighbouring pixels is substantially parallel to the corresponding gradient at one of the lower resolution levels, the weight is low in order not to blur the image; if this vector points perpendicularly towards the gradient vector the weight is high to reduce noise. Thus, it is achieved to remove noise from the current detail image and retain relevant image information, especially directional structure, as pixel-values are more locally smoothed, viz. averaged, in the current detail image, because, in this situation there is less corresponding structure in the subsequent detail image. Because directional structure in the image is appropriately taken into account, the method of processing an image according to the invention is particularly suitable for processing medical diagnostic images which image a patient's vascular system or which image a thin catheter which is inserted into a blood vessel.

The weights take into account that the gradient of pixel-values in the subsequent detail image can vary from pixel to pixel. Thus, especially curved edges in the image are appropriately taken into account for controlling filtering. Edges in the image that represent important information may be curved; in medical diagnostic images that is often the case. Preferably, the magnitude of the difference between pixel values of least one of the coarser resolution levels is calculated both for the pixel to be filtered and for the neighbouring pixel used for filtering. The weight is preferably chosen to be low if the magnitude of at least one of the two differences is high. For such curved structures, the direction of the gradient changes along that structure. Therefore, the gradient at the pixel to be filtered and at the neighbouring pixel may point into different directions. This means that a neighbouring pixel, being located perpendicularly to the gradient at the pixel to be filtered, may be located essentially in the direction of the gradient at that neighbouring pixel.

Secondly, if the directional structure is not an edge but a line, the gradient magnitude may reach a minimum exactly on that line and may point along that line. Pixels near that line show a strong gradient perpendicular to that line.

In each of the two cases, the weight for computation of a local average is reduced when the gradient—calculated from one of the lower resolution levels—at the pixel to be averaged or the neighbouring pixel is substantially in the direction of the vector pointing from the pixel to be filtered toward the neighbouring pixel.

In a preferred embodiment of a method of processing an image according to the invention, the weights depend mainly on the angle between said gradient and a difference between said positions.

When the gradient in the subsequent detail image has a large magnitude with respect to the noise level of the image, the weights are not very substantially dependent on the direction of the gradient relative to the difference between relevant positions in the subsequent detail image. In particular, it is avoided that almost all weights are close to zero when gradients have a direction which is not precisely perpendicular to the difference between relevant positions in the subsequent detail image. In this way, spurious sensitivity on the matrix structure of the subsequent detail image is avoided.

In a preferred embodiment of a method of processing an image according to the invention, the coarsest resolution level is excluded from controlling the filtering. The gradient of the detail image at the lowest, i.e. coarsest, resolution level represents mainly linear ramps in the image, i.e. large areas with linearly increasing pixel-values in substantially one direction in the image. Thus, as the coarsest resolution level is excluded from controlling the filtering, influencing the filtering by linear ramps in the image is avoided. The sum of gradients in particular represents the position and strength of edges in the image.

In a preferred embodiment of a method of processing an image according to the invention, the noise level of the image is derived mainly from image information in the image. When the noise level varies with the pixel-values in the image, during processing, notably filtering, automatically the actual noise level is taken into account. Deriving the noise level from the image information is relatively simple and requires uncomplicated computations. Often, there is a predetermined relation between the pixel-values and the noise level, e.g. due to a particular stochastic process which causes the noise. In particular for x-ray images, the noise level depends on pixel-values in the image. This property of the noise level is due to the quantum shot noise in the x-radiation employed to form the x-ray image. From the U.S. patent application Ser. No. 08/770363 (now allowed) it is known per se that the noise level of the x-ray image can be derived, in essence, only from image information in the x-ray image. Often, a more accurate result for the noise level is obtained when, in addition, a few parameters pertaining to the setting of an x-ray examination apparatus employed to generate the x-ray image are taken into account.

An image processor according to the invention comprises
  a decomposition-unit for decomposing the image into detail images at successive resolution levels,
  a filter for filtering detail images to generate filtered detail images,
  the filter being adjustable in dependence on at least one subsequent detail image, said subsequent detail image having a resolution level which is lower than the resolution level of the current detail image, and
  a synthesizer for reconstructing a processed image from the filtered detail images.

An image processor according to the invention is particularly suitable for performing the method of processing an image according to the invention.

It is noted that the method of processing an image is particularly advantageously employed to process images that are generated by x-ray imaging, including computed-tomography, but also to process images generated by magnetic resonance imaging, ultrasound or electron microscopy. An x-ray examination apparatus comprises an x-ray detector, notably an image intensifier-television chain or an image sensor matrix. The x-ray detector derives an image signal, notably an electronic video signal, from the x-ray image. The image processor processes the image signal so as to generate a processed image signal. The processed image signal is suitable to display the image information in the x-ray image with a high diagnostic quality.

It is noted that the functions of the image processor according to the invention may be carried out by a suitably programmed computer. Alternatively, the image processor may be provided with a special-purpose microprocessor that is designed to carry out the functions of the image processor.

BRIEF DESCRIPTION OF THE DRAWING

These and other aspects of the invention will be elucidated with reference to the embodiments described hereinafter and with reference to the accompanying drawing wherein

FIG. 1 is a schematic diagram of an image processor according to the invention. An input image signal $a_0$ is supplied to the decomposition unit 2 which generates a plurality of detail-image signals, notably frequency-band image signals at several resolution levels. The respective detail images contain image details at different spatial scales, and at lower resolution levels, and they contain coarser details. The signal levels of the input image signal $a_0$ represent pixel-values of the input image. The operation of the decomposition unit is further elaborated with reference to FIG. 3. In the example, four decomposition levels are shown, but in practice more resolution levels may be employed, for example for an input image having $1k^2$ (1024×1024) pixels, five or six resolution levels may be used. At each resolution level, detail-image signals, notably a high-pass frequency band signal $h_k$, are formed and at the lowest resolution level, also a low-pass frequency-band signal $l_3$ is formed. Increasing index k indicates lower resolution levels. At the highest resolution level (i.e. the 0th level) the high-pass frequency-band image signal $h_0$ is applied to a filter 41 which supplies the filtered detail image, notably a filtered high-pass frequency band signal, to the synthesizer unit 3. At lower resolution levels, the high-pass frequency-band image signals $h_k$ are applied to filters 42,43 which supply the filtered detail images to the synthesizer unit 3. Also, the low-pass frequency-band image signal $l_3$ of the lowest resolution level is supplied to the synthesizer unit 3. The processed image signal $\tilde{a}_0$ is reconstructed by the synthesizer unit 3 from the various filtered detail image signals at the respective resolution levels. The operation of the synthesizer unit 3 is further elaborated with reference to FIG. 4.

The filters 41, 42, 43 compute the local weighted average at respective resolution levels of pixel-values of the respective detail-image signals $h_0, h_1, h_2$ and $h_3$ respectively. The respective filters 41,42, and 43 which generate filtered detail images $\tilde{h}_k$ are adjusted on the basis of gradients $g_{k+1}$ in the detail image of the next coarser resolution level.

Notably the pixel-values of the filtered detail-image $\tilde{h}_k$ are computed as the weighted average $$\tilde{h}_k(x) = \sum_{\Delta x \in S} \alpha(\Delta x, x, g_{k+1}) h_k(x + \Delta x)$$

Here S is a usually small region around the position x, preferably S consists of the neighbouring positions of the current position x in the current detail image. The weight factors $\alpha$ are normalised so that their sum over the region S equals unity. The weight factors $\alpha$ are decreasing functions of the local gradient and the distance vector $\Delta x$, a particular form of the weight factors is $$\alpha(\Delta x, x, g_{k+1}) = \beta(\Delta x) r[g_{k+1}(x), \Delta x] r[g_{k+1}(x+\Delta x), \Delta x]$$

where the smoothly decreasing function r is, for example, a Gaussian function $$r(g, \Delta x) = \exp\left[-\frac{(g \cdot \Delta x)^2}{v(\|g\|)}\right]$$

The rate of decrease of the function r is determined by the denominator function v. The denominator function increases with increasing gradients, so that the averaging effect is stronger more locally in the current detail image when there is a corresponding large gradient in the next coarser resolution level. Moreover, it is advantageous to take into account that there are usually contributions due to noise in the gradients. Notably, in an x-ray image, quantum shot noise gives rise to a noise component in the input image signals that is conveyed to the detail-image signals. The denominator function is arranged such that for very large gradients averaging is effective over a wide region beyond the position at issue, and when the gradient is below the noise level, averaging is effectively concentrated on a close neighbourhood of the position at issue. It appears that a suitable denominator function is $$v(\|g\|) = c + t\frac{\sigma^2(g)}{\|g\|^2} + L\|g\|^2$$

Here $\sigma(g)^2$ is the variance of the gradient which serves as a fair estimate of the noise component in the gradient. The scalar parameters c,t, and L are adjustable so as the set the relative magnitude of the various terms in the denominator function. The scalar parameters can be set empirically so that filtering has a desired directional sensitivity in order to retain elongate structures in the image The directional sensitivity of the denominator function is controlled by the parameter L, i.e. for very large gradients the denominator function depends mainly asymptotically on the angle between the gradient and the vector $\Delta x$, i.e.

$$r(g, \Delta x) \simeq \exp\left\{-\frac{\|\Delta x\|^2}{L}\cos^2[\angle(g, \Delta x)]\right\}$$

Figure 1:
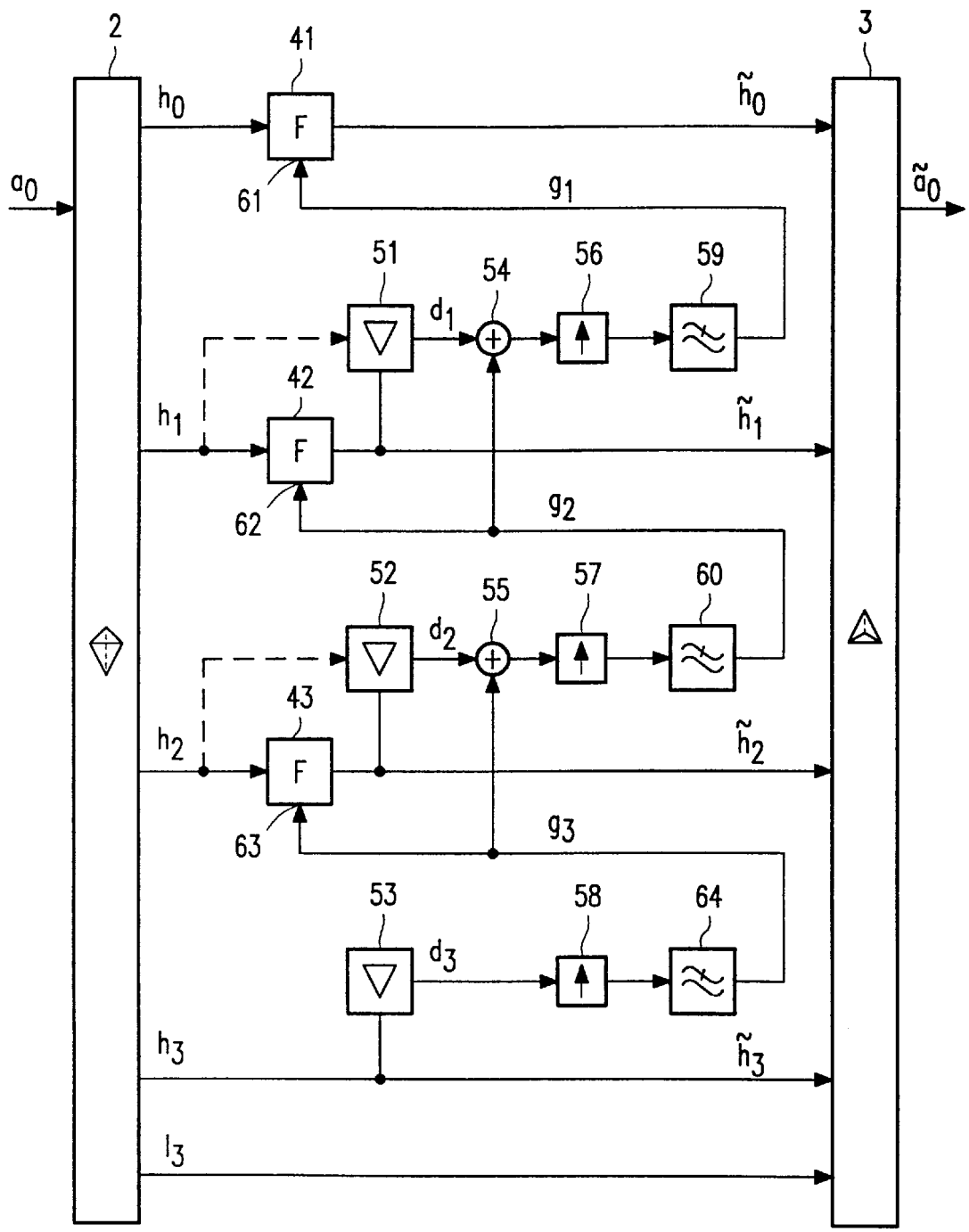
FIG. 1 shows a diagrammatic representation of an embodiment of an image processor according to the invention.
Figure 3:
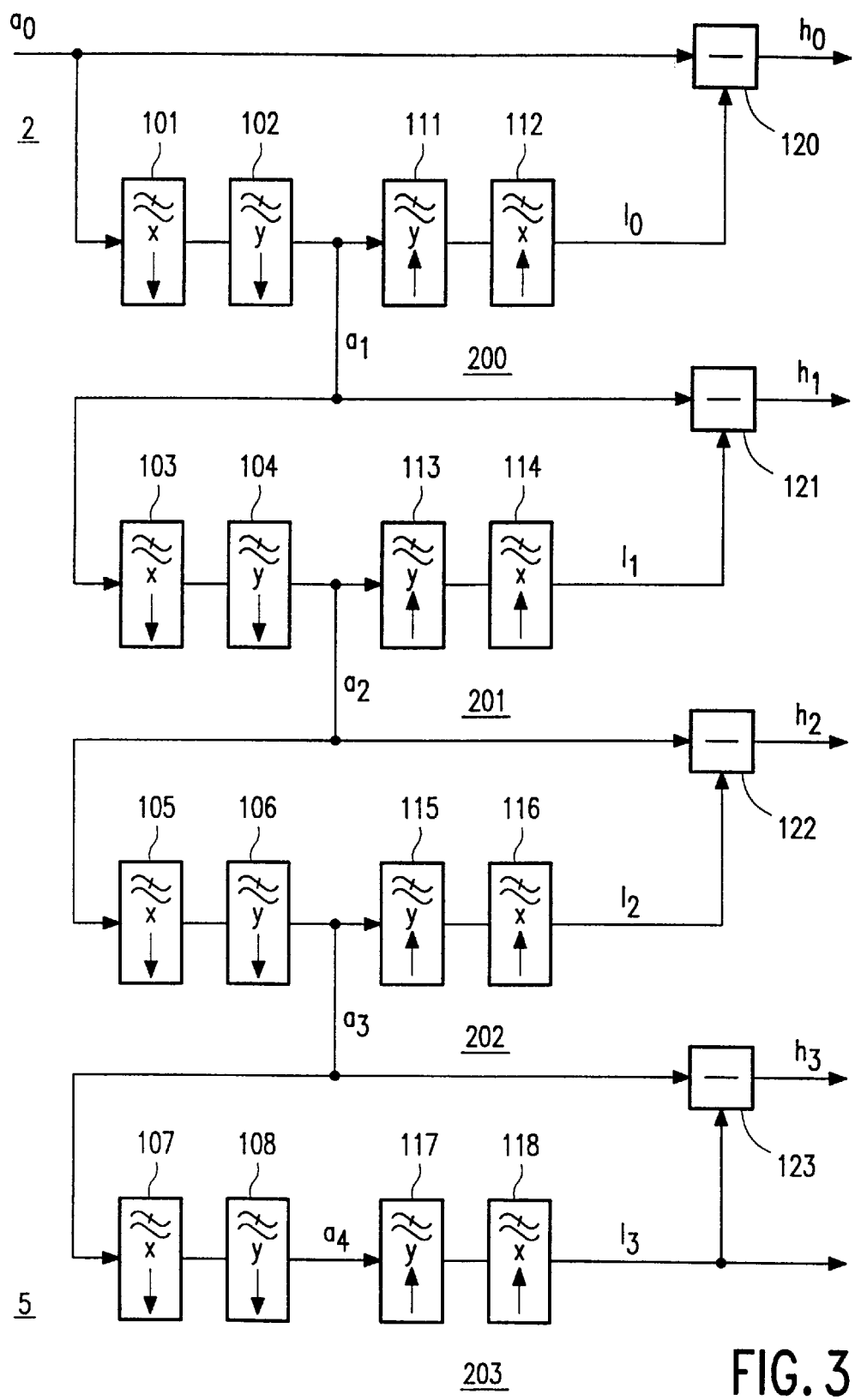
FIG. 3 shows a diagrammatic representation of a decomposition unit of the image processor according to the invention.

FIG. 3 is a schematic diagram of the decomposition unit 2 of the image processor of FIG. 1. The image signal $a_0$ is supplied to low-pass down-sampling filters 101 and 102 which perform low-pass filtering in two directions in the image (denoted as x and y) and a down-sampling operation, for example by a factor of 2. Down-sampling is simply performed by omitting every second pixel-value. The low-pass down-sampled signal $a_1$ is supplied to an interpolator 200. The interpolator 200 is formed here by a pair of low-pass up-sampling filters 111,112 which also perform an up-sampling operation in both x and y directions. The operation as an interpolator of the low-pass up-sampling filters 111,112 serves to insert zeros between successive pixel-values in the signal $a_1$ and to perform a smoothing operation. The low-pass up-sampling filters 101,102 and low-pass down-sampling filters 111, 112 may have the same or different cut-off frequencies. The interpolator 200 derives a low-pass frequency band image signal $l_0$, which is subtracted by subtracter 120 from the input image signal $a_0$ so as to form the high-pass frequency-band image signal $h_0$. The signals $a_1$ and $l_0$ include image information having variations on at least a spatial scale that corresponds to the cut-off frequency of the low-pass down-sampling filters 101 and 102.

The signal $a_1$ is subsequently passed to a pair of low-pass down-sampling filters 103 and 104 to form a signal $a_2$. A low-pass frequency band image signal 1 is derived from the signal $a_2$ by means of an interpolator 201 which comprises a pair of low-pass up-sampling filters 113,114. The signals $a_2$ and $l_1$ include image information having variations on at least a spatial scale that corresponds to the cut-off frequency of the low-pass down-sampling filters 103 and 104. By means of subtracter 121 the high-pass frequency band image signal $h_1$ for the 1st resolution level is derived from the signals $a_1$ and $l_1$, viz. $h_1=a_1-l_1$.

The signal $a_2$ is subsequently passed to a pair of low-pass down-sampling filters 105 and 106 to form a signal $a_3$. A low-pass frequency band image signal $l_2$ is derived from the signal $a_3$ by means of an interpolator 202 which comprises a pair of low-pass up-sampling filters 115,116. By means of subtracter 122 the high-pass frequency band image signal $h_2$ for the 2nd resolution level is derived from the signals $a_2$ and $l_2$. The signals $a_3$ and $l_2$ include image information having variations on at least a spatial scale that corresponds to the cut-off frequency of the low-pass down-sampling filters 105 and 106.

The signal $a_3$ is subsequently passed to a pair of low-pass down-sampling filters 107 and 108 to form a signal $a_4$. A low-pass frequency band image signal $l_3$ is derived from the signal $a_4$ by means of an interpolator 203 which comprises a pair of low-pass up-sampling filters 117,118. By means of subtracter 123 the high-pass frequency band image signal $h_3$ for the 3rd resolution level is derived from the signals $a_3$ and $l_3$. The signals $a_4$ and $l_3$ include image information having variations on at least a spatial scale that corresponds to the cut-off frequency of the low-pass down-sampling filters 107 and 108.

It will be apparent to the skilled person that the decomposition into frequency-band image signals for successive resolution levels can be continued beyond the four levels (0st to 3rd levels) shown in the embodiment of FIG. 3.

Figure 4:
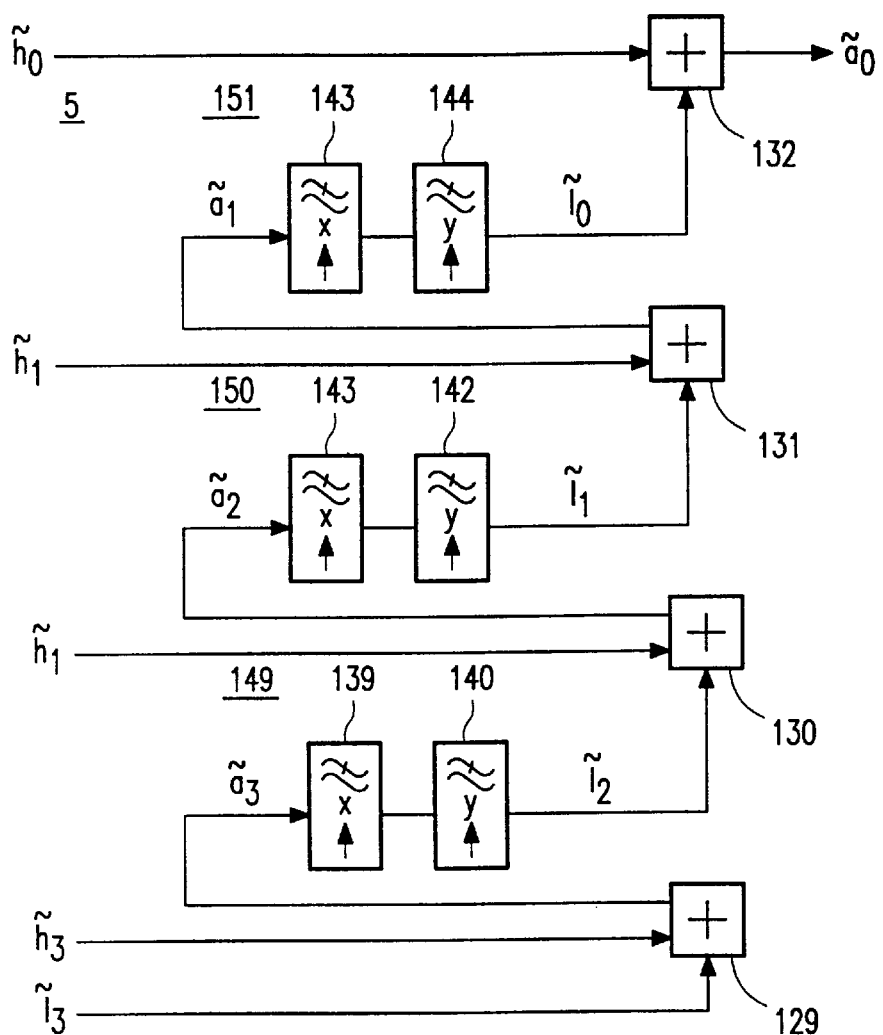
FIG. 4 shows a diagrammatic representation of a synthesizer of the image processor according to the invention.

FIG. 4 is a schematic diagram of the synthesizer 5 of the image processor of FIG. 1. The synthesizer 5 comprises an adder 129 arranged to add the low-pass frequency-band image signal $l_3$ of the lowest (in this case the 2nd) resolution level to the processed high-pass frequency-band image signal $\hat{h}_3$ so as to form a signal $\tilde{a}_3$. An interpolator 149 formed by low-pass up-sampling filters 139,140, derives a low-pass processed frequency-band image signal $\tilde{l}_2$ of the 1st resolution level. The synthesizer 5 further comprises an adder 130 arranged to add the low-pass frequency-band image signal $\tilde{l}_2$ of the lowest but one (in this case the 2nd) resolution level to the processed high-pass frequency-band image signal $\hat{h}_2$ so as to form a signal $\tilde{a}_2$. An interpolator 150 formed by low-pass up-sampling filters 141,142, derives a low-pass processed frequency-band image signal $\tilde{l}_1$ of the 1st resolution level. Another adder 131 adds the processed high-pass frequency-band image signal of the 1st resolution level $\hat{h}_l$ to the signal $\tilde{l}_1$ so as to form a signal $\tilde{a}_1$. A low-pass processed frequency-band image signal of the 0th resolution level $\tilde{l}_0$ is derived by a further interpolator 151 from the signal $\tilde{a}_1$. Finally, the filtered output image signal $\tilde{a}_0$ of the 0th resolution level is formed by still another adder 132 which adds up the signals $\tilde{l}_0$ and $\hat{h}_0$. The signal levels, viz. the signal amplitudes of the filtered output image signal $\tilde{a}_0$, represent pixel-values of the filtered output image. The interpolator 151 comprises two low-pass up-sampling filters 143,144. The interpolators 150 and 151 operate in the same manner as the interpolators 200, 201 of the decomposition unit 2. It is noted that the frequency characteristics of the low-pass up-sampling filters of the interpolators 150,151 should be accurately matched at separate resolution levels to the frequency characteristics of low-pass up-sampling filters 111 to 118 of the respective corresponding resolution levels. Said accurate matching is required so as to avoid loss of image information in the combined decomposition-synthesisation process.

Figure 5:
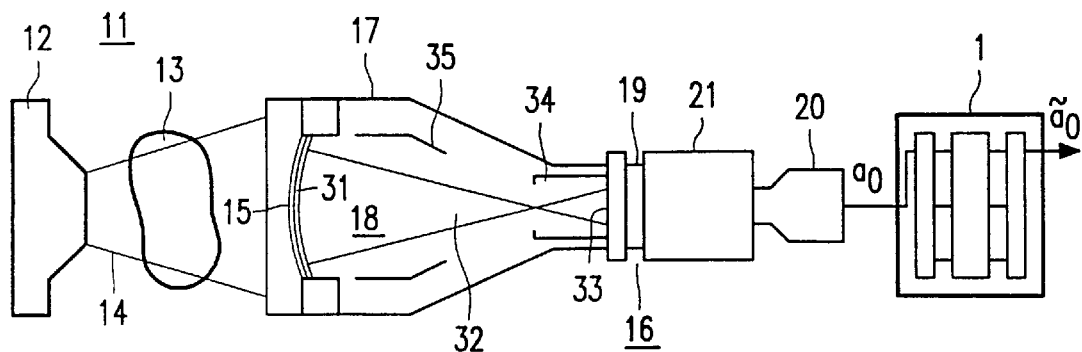
FIG. 5 shows a schematic representation of an x-ray examination apparatus wherein the invention is employed.

FIG. 5 is a schematic diagram of an x-ray examination apparatus provided with an image processor according to the invention. The x-ray examination apparatus 11 comprises an x-ray source 12 for irradiating an object 13, for example a patient who is to be radiologically examined, with an x-ray beam 14. Because of local variations of the x-ray absorption in the patient, an x-ray shadow image is formed on an x-ray sensitive face 15 of an x-ray detector 16. An electronic image signal is derived from the x-ray image by the x-ray detector. In particular the x-ray detector comprises an x-ray image intensifier 17 having an entrance section 18 which incorporates the x-ray sensitive face 15. The x-radiation incident on the entrance section 18 is converted into an image carrying electron beam which generates a light-optical image on the exit window 19. The entrance section includes the x-ray sensitive face, having the form of a scintillator screen 20, and a photocathode 31. The incident x-rays are converted in the scintillator screen into e.g. blue or ultraviolet light for which the photocathode 31 is sensitive. The electron beam 32 generated by the photocathode 31 is imaged by an electron-optical system 32 onto a phosphor screen 33 that is disposed on the exit window 19. The electron optical system includes the photocathode 31, a hollow anode 34 and a number of electrodes 35. A camera 20 is arranged to pick-up the light-optical image; to that end an optical coupling 21, e.g. a lens system, is provided to optically couple the camera 21 to the exit window 19. The electronic image signal at the output of the camera is supplied as the input image signal $a_0$ to the image processor 1 according to the invention. The output signal $\tilde{a}_0$ represents a filtered output image in which noise is substantially reduced while small details are preserved. In practice, a noise reduction of 4–5 dB can be achieved. Therefore the filtered output image has a high diagnostic quality even when a low x-ray dose is employed.

Reference is made again to FIG. 1 for a discussion of the adjustment of the filters at various resolution levels. Subtractors 51,52,53 are provided which derive local differences $d_{k+1}$ from filtered detail image signals at the next coarser resolution levels. For example, the subtracter 51 together with an addition unit 54, an up-sampler 56 and a low-pass filter 59 derives a local gradient $g_1$ which is employed to control the filter 41. To that end, the low-pass filter 59 is coupled to a control input 61 of the filter 41. More particularly, the subtracter computes a difference between pixel-values, the difference $d_i$ generated by the subtracter 51 is interpolated with the corresponding gradient $g_{k+1}$ from the next coarser resolution level, by way of addition by the addition unit 54 and by employing the up-sampler 56 which inserts zeros in the signal representing the gradient $g_k$. The up-sampling is carried-out to render the signal representing the gradient suitable to be combined with the filtered detail image signal at the next lower (less coarse) resolution level. Further, a low-pass filter 59 smooths the up-sampled signal so as to achieve a gradual interpolation of the gradients of adjoining resolution levels and divides the gradient by a factor so as to compensate for a difference between effective distances between pixels in different detail images at respective resolution levels. Notably, the addition unit 54, the up-sampler 56 and the low-pass filter 59 form an interpolator. Similarly the filter 42 of the 1st resolution level is adjusted on the basis of the gradient $g_2$ at the 2nd resolution level which is derived by a subtracter 52 together with an addition unit 55, an up-sampler 57 and a low-pass filter 60. Further, the filter 43 at the 2nd resolution level, i.e. the highest but one (coarsest but one) resolution level is adjusted on the basis of the gradient $g_3$ at the highest resolution level which is not-interpolated. As an alternative, the local gradients $g_{1,2}$ may be derived from the high-pass frequency-band image signals $h_{1,2}$ as indicated by the dashed lines in FIG. 1.

Figure 2:
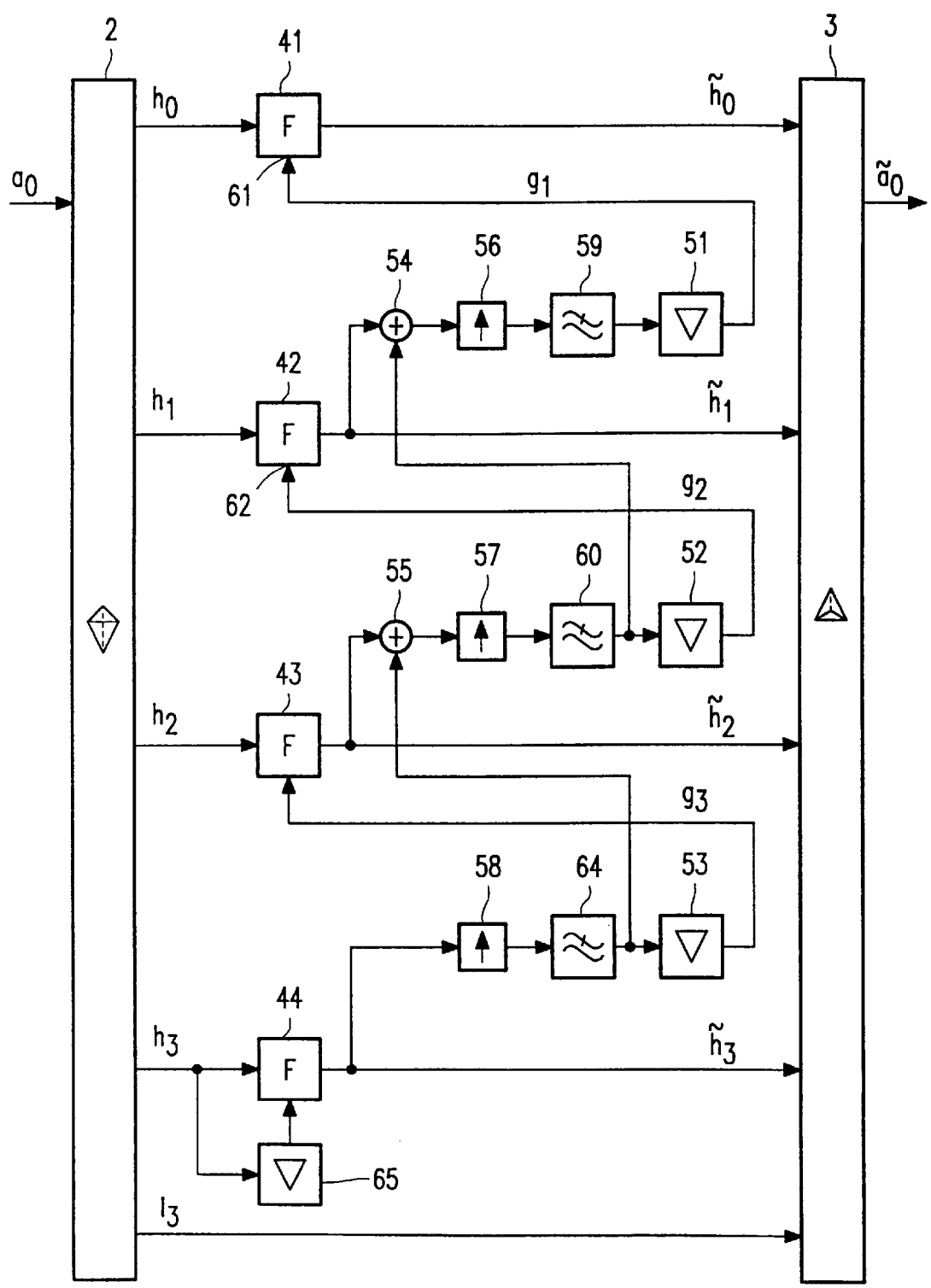
FIG. 2 shows a diagrammatic representation of another embodiment of an image processor according to the invention.

FIG. 2 shows an alternative embodiment of a signal processor according to the invention. The subtracters 51,52, 53 and the interpolation units are arranged so as to compute gradients of pixel-values of interpolations of filtered detail images at successive resolution levels. Thus, in fact the interpolation units and the subtracters are interchanged as compared to the embodiment of FIG. 1. At the lowest level, the gradient of the detail image $h_3$ is computed by a separate subtracter 65. The gradient of the detail image at the coarsest resolution level is used to control the filter 44 for the coarsest resolution level.

What is claimed is:

1. A method of processing an image comprising the steps of:
   decomposing the image into a plurality of detail images at successive resolution levels;
   filtering the plurality of detail images to generate a plurality of filtered detail images, wherein a current detail image is filtered in dependence on differences between pixel-values of at least one subsequent detail image, the subsequent detail image having a first resolution level which is lower than a second resolution level of the current detail image, and
   reconstructing a processed image from the plurality of filtered detail images.

2. A method of processing an image as claimed in claim 1, wherein filtering of the current detail image takes place in dependence on a differences between pixel-values of a next detail image having a highest resolution level which is lower than the second resolution level of the current detail image.

3. A method of processing an image as claimed in claim 1, wherein filtering of the current detail image includes computation of weighted averages of pixel-values of the current detail image, with weights depending on differences between pixel-values of pixels of the subsequent detail image, and differences between positions of the pixels in the subsequent detail image.

4. A method of processing an image as claimed in claim 3, wherein the weights depend on gradients of pixel-values of said subsequent detail image, said gradients relating to several positions in said subsequent detail image.

5. A method of processing an image as claimed in claim 3, wherein the weights are computed as a decreasing function of differences between pixel-values of pixels of said subsequent detail image and of differences between positions of said pixels in said subsequent detail image.

6. A method of processing an image as claimed in claim 3, wherein for a gradient of pixel-values at respective positions in said subsequent detail image, said gradient being substantially larger than a threshold that relates to a noise level of the image, the weights depend mainly on the angle between said gradient and a difference between said positions.

7. A method of processing an image as claimed in claim 1, wherein filtering of the current detail image takes place in dependence on a sum of gradients of pixel-values of detail images from a group of detail images not including the detail image at the coarsest resolution level.

8. A method of processing an image as claimed in claim 1, step of deriving further comprising noise level of the image in accordance with image information in the image.

9. A method of processing an image as claimed in claim 4, wherein filtering of the current detail image takes place in dependence on a sum of gradients of pixel-values of detail images from a group of detail images not including the detail image at the coarsest resolution level.

10. An image processor comprising:
- a decomposition circuit arranged to decompose the image into detail images at successive resolution levels,
- a filter, coupled to the decomposition circuit, capable of filtering detail images to generate a plurality of filtered detail images, the filter being adjustable in dependence on differences between pixel-values of at least one subsequent detail image, the subsequent detail image having a first resolution level which is lower than a second resolution level of the current detail image, and
- a synthesizer coupled to the filter circuit, capable of reconstructing a processed image from the filtered detail images.

11. An x-ray examination apparatus comprising an image processor as claimed in claim 10.

* * * * *